US008457299B2

(12) United States Patent  (10) Patent No.: US 8,457,299 B2
Miller et al.  (45) Date of Patent: *Jun. 4, 2013

(54) TECHNIQUE FOR PROVIDING A PERSONALIZED ELECTRONIC MESSAGING SERVICE THROUGH AN INFORMATION ASSISTANCE PROVIDER

(75) Inventors: John Miller, Canby, OR (US); Timothy Timmins, Beaverton, OR (US)

(73) Assignee: Grape Technology Group, Inc., Bethlehem, PA (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/961,827

(22) Filed: Dec. 7, 2010

(65) Prior Publication Data

US 2011/0302255 A1  Dec. 8, 2011

Related U.S. Application Data

(63) Continuation of application No. 10/903,454, filed on Jul. 30, 2004, now Pat. No. 7,912,206.

(51) Int. Cl.
*H04M 3/00* (2006.01)
(52) U.S. Cl.
USPC ............... 379/265.09; 379/88.13; 379/93.24; 379/100.08; 455/412.1; 709/206
(58) Field of Classification Search
USPC .......... 379/93.24, 100.08, 265.09; 455/412.1, 455/412.2, 466; 709/206
See application file for complete search history.

(56) References Cited

U.S. PATENT DOCUMENTS

| 6,067,561 | A | * | 5/2000 | Dillon | 709/206 |
| 7,397,912 | B2 | * | 7/2008 | Aasman et al. | 379/266.03 |
| 7,489,766 | B2 | * | 2/2009 | Morganstein et al. | 379/88.02 |
| 2002/0194279 | A1 | * | 12/2002 | Chern | 709/206 |

* cited by examiner

Primary Examiner — Md S Elahee
(74) Attorney, Agent, or Firm — Sofer & Haroun, LLP

(57) ABSTRACT

To provide a personalized voice email service, data pertaining to one or more of a user's email accounts, e.g., email addresses and account access data, is maintained in a folder by an information assistance service, which is unaffiliated with the email service providers (e.g., AOL, Hotmail, etc.) maintaining the user's email accounts. When the user calls the information assistance service, the user's folder is retrieved. The user's email accounts may be accessed on behalf of the user based on the email addresses and account access data in the user's folder. An information assistance provider including, e.g., an operator and/or a voice server, may present information concerning the email messages received in the user's email accounts in different manners. For example, the information assistance provider may report to the user selected email messages that satisfy one or more predetermined criteria, e.g., only those email messages which have been received since the last time the user called the information assistance service. Header information (e.g., sender/address, subject, etc.) concerning the selected email messages may be announced to the user. At the user's request, the information assistance provider may open and read a email message to the user. The user may then send a reply email message, or forward the email message to other recipients.

14 Claims, 15 Drawing Sheets

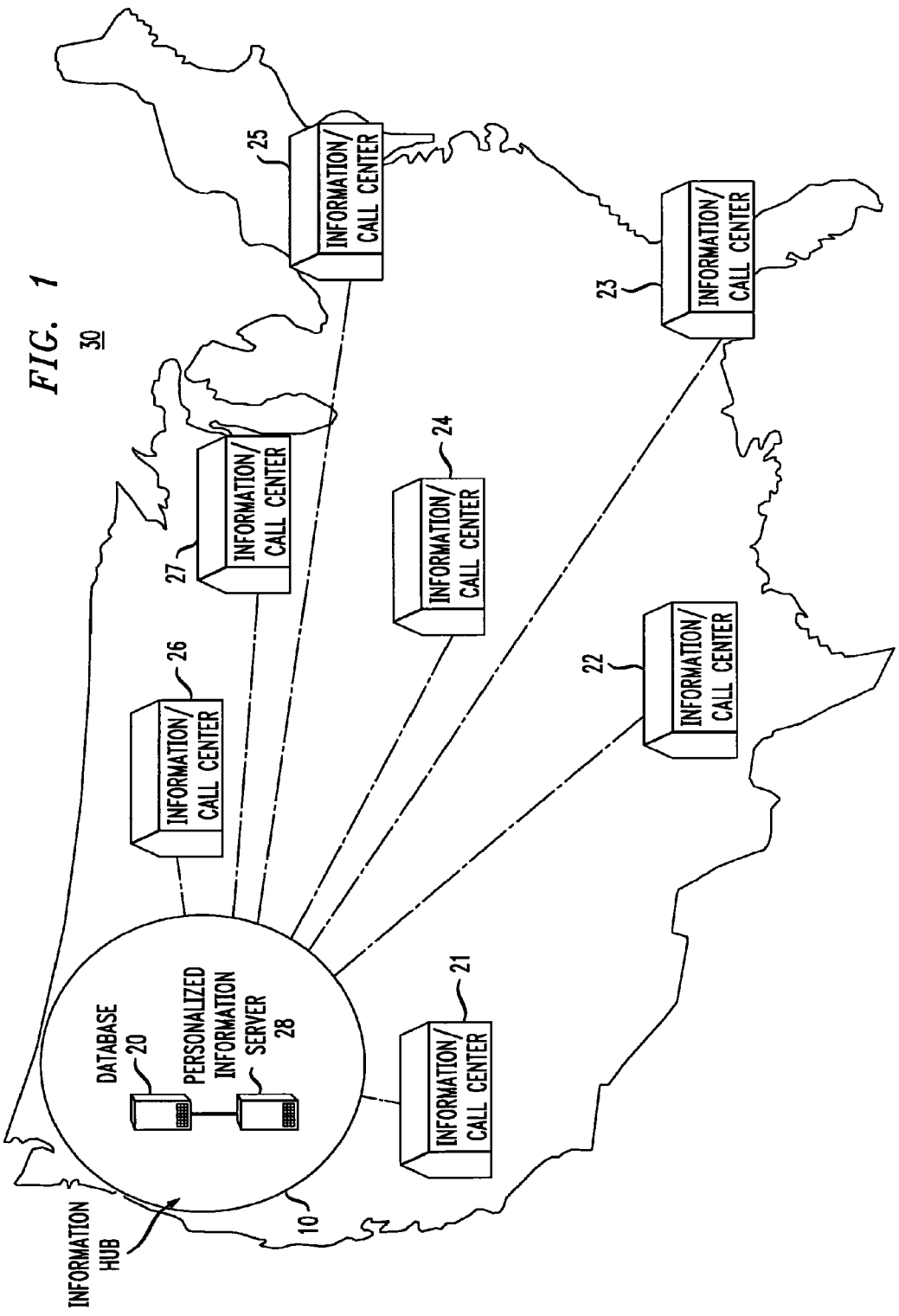

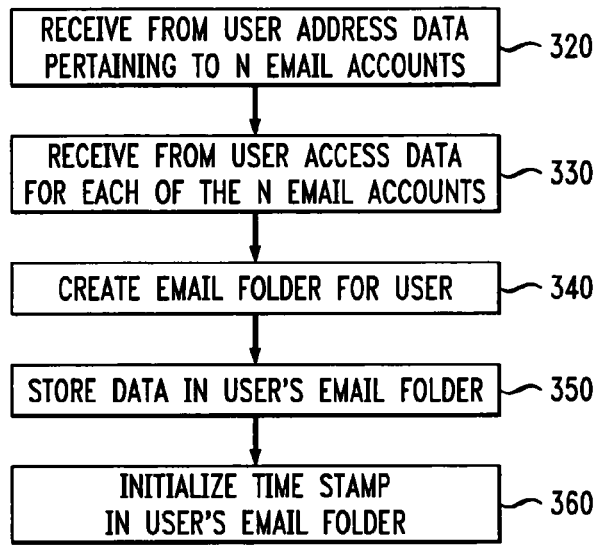

FIG. 6

LOGIN

PHONE NUMBER OR USERNAME [_____] ⟵ 501

PASSWORD [_____] ⟵ 504

[LOGIN] [HELP]

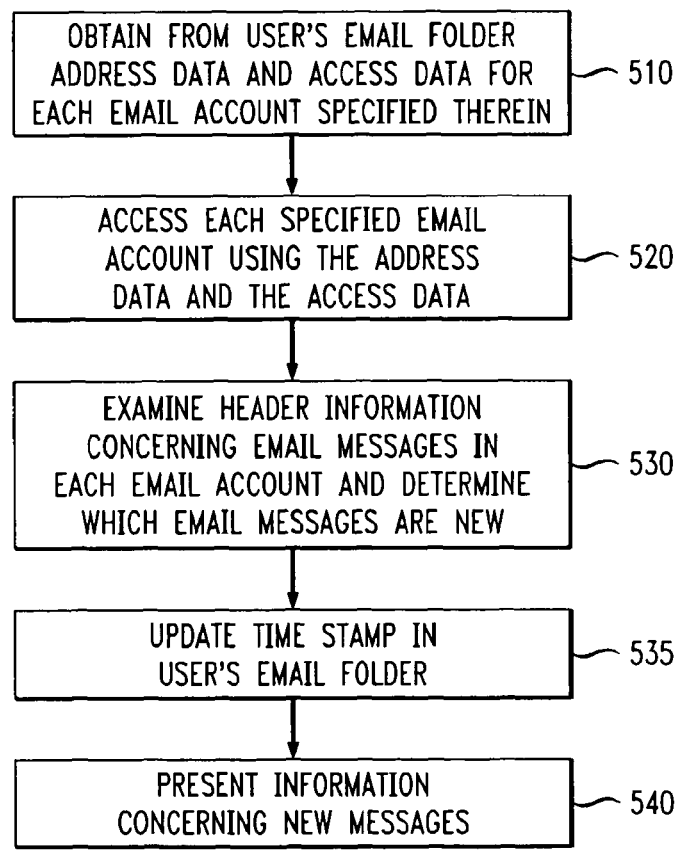

FIG. 7

OBTAIN FROM USER'S EMAIL FOLDER ADDRESS DATA AND ACCESS DATA FOR EACH EMAIL ACCOUNT SPECIFIED THEREIN — 510

ACCESS EACH SPECIFIED EMAIL ACCOUNT USING THE ADDRESS DATA AND THE ACCESS DATA — 520

EXAMINE HEADER INFORMATION CONCERNING EMAIL MESSAGES IN EACH EMAIL ACCOUNT AND DETERMINE WHICH EMAIL MESSAGES ARE NEW — 530

UPDATE TIME STAMP IN USER'S EMAIL FOLDER — 535

PRESENT INFORMATION CONCERNING NEW MESSAGES — 540

FIG. 8A

INBOX ASSOCIATED WITH Address1

| SENDER/ADDRESS | SUBJECT | DATE AND TIME |
|---|---|---|
| 791 → Mike Sullivan | New Profile Server | Thu 06/24/YY 04:55:10 p.m. |
| John McGrath | New Client | Thu 06/24/YY 09:28:13 a.m. |
| The Daily Dish | The Daily Dish - Shopping | Wed 06/23/YY 08:18:37 a.m. |
| 794 → Keld | Gooday Mate! | Sat 06/12/YY 11:07:09 p.m. |
| 795 → Sarah Chang | Good Movie Review | Fri 06/11/YY 03:20:23 p.m. |
| 796 → Mike Sullivan | Security Patch | Thu 06/10/YY 12:48:30 p.m. |
| 797 → Keld | Havin' a Good Time | Tue 06/01/YY 01:01:49 a.m. |
| 798 → GreenGrocer | Asparagus Sale | Sat 05/30/YY 07:49:07 a.m. |

FIG. 8B

INBOX ASSOCIATED WITH Address2

| SENDER/ADDRESS | SUBJECT | DATE AND TIME |
|---|---|---|
| Johannes Taylor | Good Article | Thu 06/24/YY 04:49:03 p.m. |
| Walmart.com | Discount Prices | Wed 06/16/YY 04:12:31 p.m. |
| Alexandra@aol.com | Shummalumma | Sun 06/13/YY 09:10:19 a.m. |
| Alexandra@aol.com | Shumma | Sun 06/13/YY 08:48:33 a.m. |
| Johannes Taylor | Re: Mexico | Fri 04/09/YY 05:50:12 p.m. |
| Johannes Taylor | Read This | Wed 04/07/YY 03:06:50 p.m. |

FIG. 8C

INBOX ASSOCIATED WITH Address3

| SENDER/ADDRESS | SUBJECT | DATE AND TIME |
|---|---|---|
| Jjill.com | Summer Sale | Tue 06/15/YY 04:03:00 p.m. |
| RadioShack.com | Your Order | Sat 06/12/YY 11:25:29 a.m. |
| Jane Kawasaki | Requested Documents | Mon 04/12/YY 08:55:12 a.m. |

REPLY EMAIL FORM

Date: June 24, YYYY    Time: 10:53:05

- 1332 — To:
- 1334 — From:
- 1336 — Subject:
- 1345 — (Reply Message or Attachment w/Audio File)
- 1346 — (Original Message)

FORWARD EMAIL FORM

Date:    Time:

- 1372 — To:
- 1374 — From:
- 1376 — Subject:
- 1385 — (Additional Message by User)
- 1386 — (Original Message)

| Today's Date: Friday, June 25, YYYY | 448 | Time: 08:18:30 a.m. | 449 |

451 — USERNAME [MR. SMITH]
452 — NEW EMAIL MESSAGES [7]   453 — MESSAGES (TOTAL) [17]

NEW MESSAGES AT [ADDRESS1]

| SENDER/ADDRESS | SUBJECT | DATE AND TIME | | |
|---|---|---|---|---|
| 1742 — Keld | Gooday Mate! | Sat 06/12/YY 11:07:09 p.m. | OPEN | DELETE |
| Sarah Chang | Good Movie Review | Fri 06/11/YY 03:20:23 p.m. | OPEN | DELETE |
| Mike Sullivan | Security Patch | Thu 06/10/YY 12:48:30 p.m. | OPEN | DELETE |
| Keld | Havin' a Good Time | Tue 06/01/YY 01:01:49 a.m. | OPEN | DELETE |

NEW MESSAGES AT [ADDRESS2]

| SENDER/ADDRESS | SUBJECT | DATE AND TIME | | |
|---|---|---|---|---|
| Alexandra@aol.com | Shummalumma | Sun 06/13/YY 09:10:19 a.m. | OPEN | DELETE |
| Alexandra@aol.com | Shumma | Sun 06/13/YY 08:48:33 a.m. | OPEN | DELETE |

NEW MESSAGES AT [ADDRESS3]

| SENDER/ADDRESS | SUBJECT | DATE AND TIME | | |
|---|---|---|---|---|
| RadioShack.com | Your Order | Sat 06/12/YY 11:25:29 a.m. | OPEN | DELETE |

2030

TECHNIQUE FOR PROVIDING A PERSONALIZED ELECTRONIC MESSAGING SERVICE THROUGH AN INFORMATION ASSISTANCE PROVIDER

RELATED APPLICATION

This application is a continuation application of U.S. patent Ser. No. 10/903,454, filed on Jul. 30, 2004, the entirety of which is incorporated by reference.

FIELD OF THE INVENTION

The invention relates to a communications system and method, and more particularly to a system and method for enabling a user of an information assistance service to access electronic messaging services including, e.g., email services.

BACKGROUND OF THE INVENTION

In this information age, people need to be well informed and organized to effectively carry out day-to-day activities, especially when they are traveling and away from their "home" base where they normally conduct their business. As a result, use of mobile devices which facilitate mobile communications, such as wireless telephones, is ubiquitous.

Wireless phones conveniently allow users while traveling to call and communicate with other people. In case a user cannot remember the telephone number of a contact or it is not handy, or the user wants to obtain directions and other information concerning, e.g., restaurants, theaters, etc., he or she can call an information assistance provider for assistance which includes, e.g., an operator, a voice server, etc. To that end, an expansive network of communication call centers has been established which provides users with nationwide assistance.

Email messaging has in recent years become a widespread tool used for communicating. Many individuals maintain email accounts with different email service providers (ESPs), e.g., America Online (AOL), Hotmail, etc. However, a shortcoming of common telephones, including wireless phones, is their inability to access email messages in such accounts.

SUMMARY OF THE INVENTION

The invention enables a user to communicate with (e.g., by calling) an information assistance provider to receive information concerning email messages received in the user's email accounts, which are furnished by providers unaffiliated with the information assistance provider. In accordance with the invention, data concerning access to one or more email accounts associated with a user is stored at the information assistance service. When a communication from the user is received through a first communications connection, the data is retrieved and used to access the one or more email accounts over a second communications connection. One or more operations are performed with respect to one or more email messages received in the one or more email accounts on behalf of the user. Information concerning at least one email message in the one or more email accounts is provided to the user. For example, a list of email messages that satisfy one or more predetermined criteria may be reported to the user. New email messages, e.g., email messages received since the last time the user called the information assistance service, may be reported.

In accordance with an aspect of the invention, header information (e.g., sender name/address, subject, etc.) may be provided to the user for selected email messages. At the user's request, a selected email message may be opened and read to the user. The user may then, if he/she wishes, send a reply email message. In connection with generating a reply email message, the user may be prompted to state a voice message, which is converted into an audio file and attached to the reply email message. The reply email message is then sent to a recipient. In addition, the email message may be forwarded to a specified recipient at the request of the user.

BRIEF DESCRIPTION OF THE DRAWINGS

Further objects, features and advantages of the invention will become apparent from the following detailed description taken in conjunction with the accompanying drawing showing an illustrative embodiment of the invention, in which:

FIG. 1 illustrates a communications system including information/call centers, in accordance with the invention;

FIG. 4 is a flowchart depicting a routine for eliciting from a user information concerning one or more email accounts, in accordance with the invention;

FIG. 5 illustrates a record maintained in a user's email folder, in accordance with the invention;

FIG. 6 illustrates a Login graphical user interface (GUI) for providing personalized information and communications services, in accordance with the invention;

FIG. 7 is a flowchart depicting a routine for providing information concerning statuses of a user's email accounts, in accordance with the invention;

FIGS. 8A-8C respectively illustrate lists of email messages received in various email accounts maintained by a user;

FIG. 15A illustrates an example of a reply email form, in accordance with the invention;

FIG. 15B illustrates an example of a forward email form, in accordance with the invention;

FIG. 19 illustrates a GUI containing information concerning the email messages resulting from the screening using the time range message filter.

DETAILED DESCRIPTION

Figure 2A:
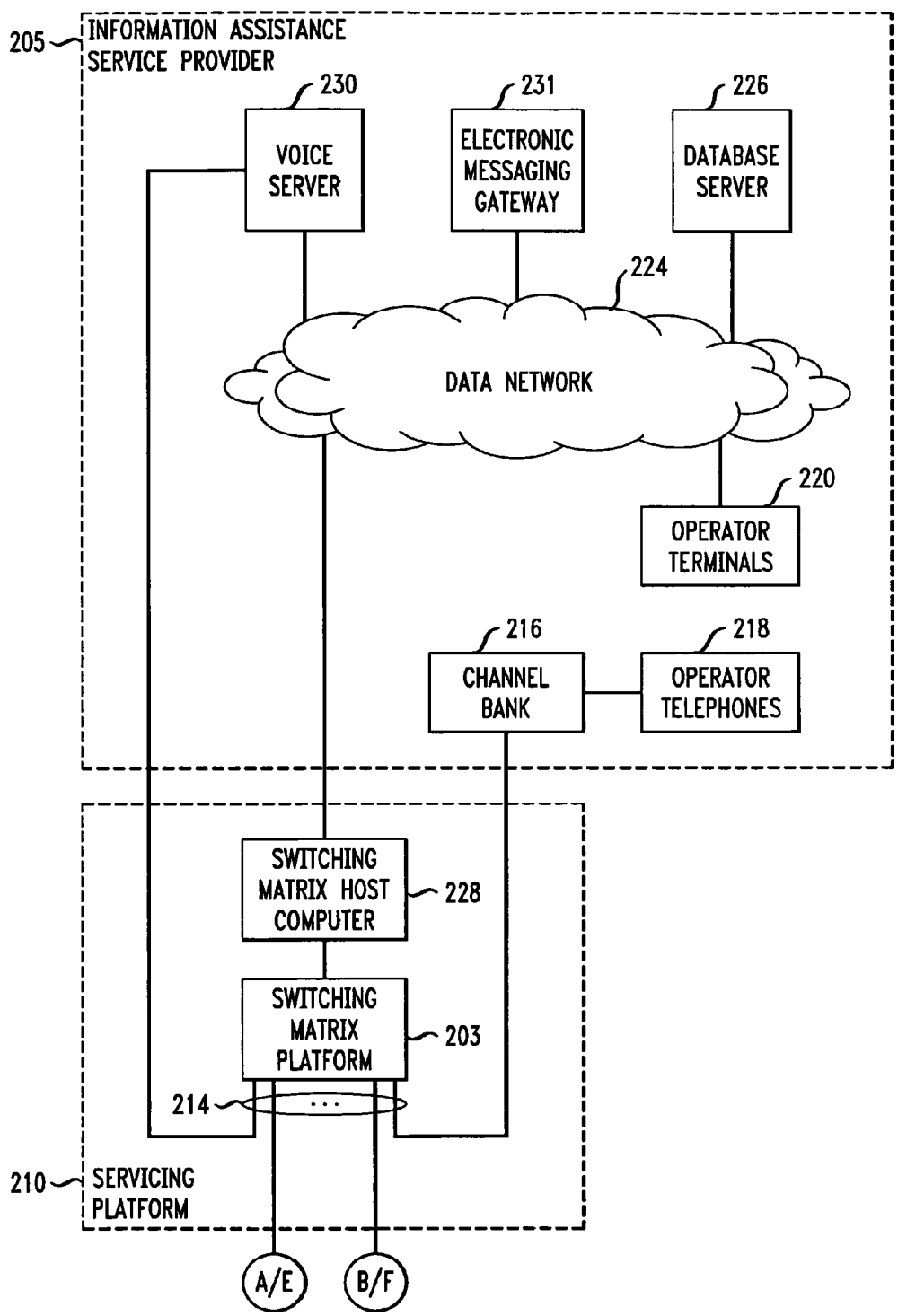
FIGS. 2A and 2B are block diagrams of components of the communications system of FIG. 1.

The invention is directed to providing personalized information and communications services to users, e.g., telephone and mobile device users. One of these services is a personalized voice email service in accordance with the invention, which allows a user to, among others, access email in one or more email accounts via voice media.

To facilitate tailoring the information assistance service to individuals' needs, one or more folders are maintained for a user, based on which the service is rendered to the user. For example, as disclosed in copending, commonly assigned U.S. application Ser. No. 09/865,230, filed on May 25, 2001, incorporated herein by reference, contacts folders and appointment folders may be created and maintained to store a user's contacts and appointments information, respectively. In addition, in accordance with an aspect of the invention, an email folder may be created and maintained to store a user's email information, e.g., data pertaining to one or more email accounts that the user wishes to access via the information assistance service. Such email accounts were previously established by the user with such email service providers (ESPs) as AOL, Hotmail, etc., which are unaffiliated with the present information assistance service provider. With the email folder in place, when the user accesses, e.g., by calling, the information assistance service, the user may be informed of any newly arrived email messages in his/her various email accounts, may be able to learn the content of an email message and reply thereto, and may take advantage of other related services offered by the information assistance provider, as will be fully described below.

Like a contacts or appointments folder, an email folder for a user may be maintained by the information assistance service in association with an identifier of the user, e.g., the user's telephone number. Thus, in this particular illustrative embodiment, when an information assistance call is received, the subject service locates the folders associated with the caller based on an automatic number identification (ANI) associated with the call. As is well known, the ANI identifies the telephone number of the communications device from which the call originates. However, it should be noted that a user identification (ID), password, PIN, mother's maiden name, user voiceprint, etc. may be used in combination with, or in lieu of, an ANI to identify a user. For example, use of a voiceprint to identify a user is disclosed in copending, commonly assigned U.S. application Ser. No. 10/403,207 filed on Mar. 31, 2003, incorporated herein by reference.

FIG. 1 illustrates a communications system for providing, inter alia, a personalized voice email service in accordance with the invention. This communication system includes wide area network (WAN) 30 covering an extensive area. WAN 30 may be an Internet-based network such as the World Wide Web or a private intranet based network. WAN 30 connects operators dispersed throughout a wide coverage area in information/call centers 21 through 27. It should be noted that the term "operators" used herein broadly encompasses entities that are capable of providing assistance in a telecommunications environment, including without limitation human operators, voice response/recognition capabilities, web-/WAP-enabled operator services, and other automated and electronic access. One or more information hubs 10 are also included in WAN 30. An information hub 10 includes one or more personalized information servers 28 which are accessible by the operators in the system, and one or more databases 20 in which users' email, contacts, appointments and other folders may be stored and maintained. Such folders may also be stored locally at one or more of the information/call centers. The folders and information at different centers are synchronized. Synchronized databases provide necessary backup as well as support to roaming mobile device users.

Figure 2B:
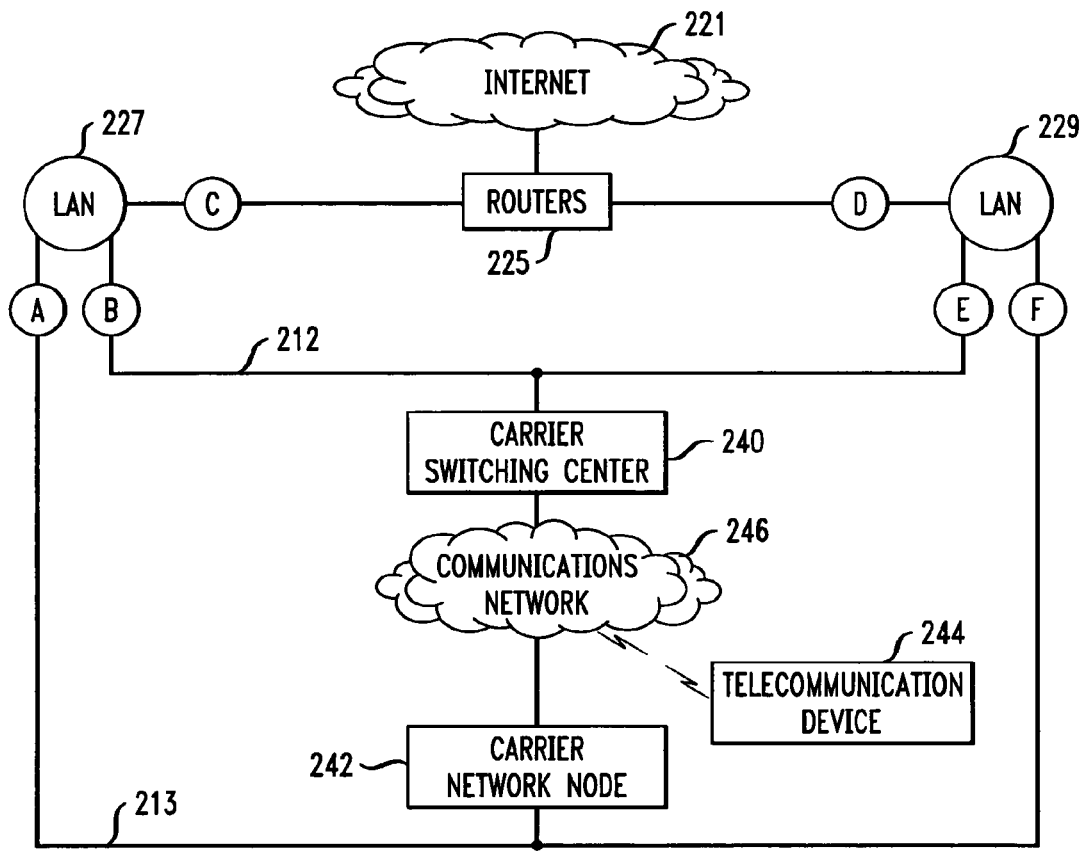

Referring to FIGS. 2A and 2B, information/call center 200 (which generically represents one of aforementioned information/call centers 21 through 27) is attended by operators, which includes information assistance service provider 205 and servicing platform 210. It should be noted that even though both provider 205 and servicing platform 210 appear in the same figure, they may or may not be located in the same geographic area. Servicing platform 210 comprises switching matrix host computer 228, and switching matrix platform 203 which is connected via T1 communication links 214 to, among others, voice server 230 and channel bank 216 in provider 205.

Channel bank 216 is used to couple multiple operator telephones 218 to platform 203. The operators in center 200 are further equipped with operator terminals 220, each of which includes a video display unit and a keyboard with associated dialing pad. Operator terminals 220 are connected over data network 224 to one or more database server(s) 226 (although only one is shown here). Database server 226 provides access to, among others, directory information from multiple sources. Database server 226 enables the operator to search directory information not just by name and address (sometimes city or area code) of a desired party, but also by type of goods/services and/or geographical region of a desired entity.

Data network 224 further connects to voice server 230, electronic messaging gateway 231, and switching matrix host computer 228, which in turn is connected to switching matrix platform 203 via a data link. Data network 224 includes, but is not limited to, local area network (LAN) 227, best seen in FIG. 2B. LAN 227 may connect to other similar remote LANs 229 to form WAN 30 in FIG. 1. LANs 227 and 229 are connected to one another and to Internet 221 via routers 225.

A user's telephone, computer, PDA or other telecommunication device 244 communicates via communications network 246 which is connected to carrier network node 242 and carrier switching center 240. T1 voice links 212 provide connection between the information/call center's switching matrix platform 203 and carrier's switching center 240, through which incoming information service calls are received. T1 voice links 212 further provide connection to the carrier switching center 240 through which outgoing calls are placed over communications network 246 (which network may be different than that used for incoming calls). Similarly, T1 data links 213 provide a signaling connection between the information/call center's node (not shown) and carrier network node 242, through which incoming and outgoing signaling messages are transported. The information/call center node is contained within switching matrix platform 203, but one with skill in the art will appreciate that the information/call center node could also be a physically distinct component.

The operation of switching matrix platform 203 is governed by computer-readable instructions stored and executed on switch matrix host computer 228. In this illustrative embodiment, platform 203 includes, inter alia, arrays of digital signal processors (DSPs). These DSPs can be programmed and reprogrammed to function as, among other things, call progress analyzers (CPAs), call progress generators (CPGs), multi-frequency (MF) tone generators/detectors, dual-tone multi-frequency (DTMF) generators/detectors, or conference units, depending on the demand placed on center 200 and platform 203 for each corresponding function.

Voice server 230 is connected via data network 224 to computer 228 (to which it acts as a slave processor) and via one or more T1 links to switching matrix platform 203. Each voice server 230 when more than one is employed in information/call center 200, connects to switching matrix platform 203 via a separate T1 link. Voice server 230 comprises a general purpose computer incorporating one or more voice cards, which serve as the interface between server 230 and the T1 span to switching matrix platform 203. One such voice card in server 230 monitors and controls communications over the T1 span. Its capabilities include telephone tone (e.g., DTMF or MF) detection and generation, voice recording and playback, and call progress analysis. Voice server 230 in this instance also contains a voice recognition device for receiving verbal input from a party connected thereto. Voice server 230 is employed to play the constantly repeated parts of an operator's speech, including, for example, the caller's desired telephone number where requested, and possibly other information. At appropriate stages in a call progression, switch matrix host computer 228 initiates a voice path connection between voice server 30 and switching matrix platform 203 such that the user, or the user and the operator, are able to hear whatever pre-recorded speech is played on that connection by voice server 230. Computer 228 then instructs voice server 230, via data network 224, what type of message to play, and passes data parameters that enable voice server 230 to locate the message appropriate to the call state.

Figure 3:
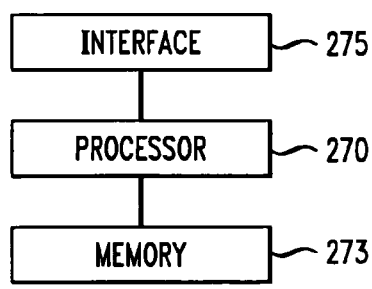
FIG. 3 is a block diagram of an electronic messaging gateway in the communications system of FIG. 1.

FIG. 3 illustrates electronic messaging gateway 231, which includes processor 270, memory 273 and interface 275. Instructed by software stored in memory 273, processor 270 is configured for communicating with email servers through interface 275, which may be, e.g., POP3 (Post Office Protocol Version 3) or IMAP (Internet Message Access Protocol) compliant email servers. Interface 275 provides processor 270 with access to data network 224 and thence to Internet 221. For example, in response to signals from terminal 220, processor 270 may initiate Internet access and communicate with email servers operated by such ESPs as AOL, Hotmail, etc. Processor 270 causes one or more email messages in a user's specified email accounts to be downloaded from the email servers, or alternatively may obtain data describing the email messages without downloading the actual email messages. Selected portions of the messages or data may be transmitted to terminal 220 for presentation to a human operator who in turn conveys the same to the user, or to voice server 230 which communicates the same to the user in automated voice.

Users of a particular telephone carrier may dial, speak or otherwise communicate predetermined access digits, access codes or retail numbers, or input a predetermined address or a Uniform Resource Locator (URL) established for information assistance by that company. The instant example assumes that the user dials, e.g., "411," "*555," "555-1212," "1-800-555-1212," "00," or other designated access numbers. The participating telephone company's own switching system will then reroute the call to information/call center 200 (via a T1 channel), where it appears as an incoming call.

Automatic call distribution (ACD) logic is used to queue (if necessary) and distribute calls to operators in the order in which they are received, and such that the call traffic is distributed evenly among the operators. In other embodiments, other distribution logic schemes may be utilized, such as skills-based routing based on, e.g., a preferred call handling method specified by a user profile, or a priority scheme for preferred callers. The queue is maintained by switching matrix host computer 228.

To subscribe to the personalized voice email service, the user may call an operator at the designated access number. As part of the registration, the operator enters at a user data web page on server 28 user identifying information including username, password, and telephone number of the particular telecommunications device, e.g., a wireless telephone in this instance, which the user would use to call the information assistance service in the future. It is particularly advantageous to use such a phone number (also known as a mobile directory number (MDN) in the case of a wireless phone number) to identify the user since, as described before, the calling number would be automatically captured as an ANI at information/call center 200 when the user calls. Specifically, platform 214 in center 200 in a well-known manner derives the ANI from the call set-up signals associated with the user's call.

During the registration, the operator may also ask the user which email accounts he/she wishes to have associated with the personalized voice email service. The user responds by identifying, say, N, email accounts, where N is an integer greater than or equal to one. Thus, as part of the registration, email address information pertaining to the user's N email accounts is received from the user, as indicated at step 320 in FIG. 4. For example, the user may provide such email addresses as smith@aol.com, smith@hotmail.com, etc. It may be necessary to prompt the user to provide sufficiently detailed information to enable electronic messaging gateway 231 to access the specified email accounts. For example, at step 330, the operator elicits and receives from the user access data for each of the N email accounts. Access data may include, e.g., a username, password, etc., associated with each email account. At step 340, an email folder is created for the user in database 20. As mentioned before, such an email folder may be stored in databases 20, in association with the user's identification data (such as an ANI) for the user's access to his/her email accounts. At step 350, the user's name (and other identifying information, if any), the email account addresses, and the email account access data are stored in a record in the user's email folder.

FIG. 5 illustrates one such record 710 that may be maintained in an email folder of a hypothetical user named Mr. Smith. Record 710 comprises fields 720, 725, 730, 761*a-b*, 762*a-b* and 763*a-b*. In this example, field 720 contains Mr. Smith's name. Field 725 contains a time stamp representing a date and time at which Mr. Smith most recently called the information assistance service and accessed the personalized voice email service. Fields 761*a* and 761*b* respectively contain the email address (Address1) of Mr. Smith's first email account and access data (Access_Data1) therefor provided by Mr. Smith. Fields 762*a* and 762*b* respectively contain the email address (Address2) of Mr. Smith's second email account and access data (Access_Data2) therefor provided by Mr. Smith. Fields 763*a* and 763*b* respectively contain the email address (Address3) of Mr. Smith's third email account and access data (Access_Data3) therefor provided by Mr. Smith. It should be noted that although in this example, data for three email accounts is maintained in record 710, in alternative embodiments data for any number of email accounts may be maintained.

Returning briefly to FIG. 4, at step 360, the time stamp in field 725 of record 710 is initialized with the current time for future reference. Subsequently, the time stamp is updated every time the user checks his/her email through the personalized voice email service.

The operator may also ask the user if he/she wishes to specify a default reply address for recipients of the user's email messages to reply thereto. If the user specifies a default reply address, e.g., one of Address1, Address2 and Address3 in the Mr. Smith case, the default reply address is registered in field 730 of record 710.

The user may subsequently use telecommunications device 244, e.g., a wireless phone, to call the information assistance service. Let's say the call is routed to information assistance/call center 200 where an operator attends to the call. After the user communicates his/her needs, e.g., to access the personalized voice email service, the operator at terminal 220 establishes communications with personalized information server 208 through WAN 30 (or alternatively Internet 221). In response, server 28 presents on terminal 220 a Login graphical user interface (GUI), which is illustrated in FIG. 6. As shown in FIG. 6, the operator is prompted to enter the user's phone number or username to identify the user, and a password to verify that the user is authorized to access the information assistance service. The ANI received from his/her communication device may be automatically provided in entry 501 of the Login GUI by server 28, thereby obviating the need of the operator's eliciting from the user, and entering, the required phone number or username. (In the event that such an ANI is not automatically available, or where the user is accessing the subject service from an unknown point or the operator suspects that the user calls from a phone number other than the registered phone number, the operator may verify/obtain the necessary identifying information with/from the user.) At entry 504, the operator enters the password provided by the user to complete the login process. The login information is then transmitted to server 28, where it checks the aforementioned user data web page to verify the received ANI and password. After they are verified, server 28 identifies the user's email folder based on the ANI. A copy of the user's email folder is provided to electronic messaging gateway 231.

Let's suppose, for example, that Mr. Smith calls the information assistance service, and after his authorization is established, he asks the operator to tell him how many new email messages are in his email accounts. The operator may select a predetermined option on the screen of terminal 220, and in response, gateway 231 uses the information in Mr. Smith's email folder, and in particular record 710 therein, to access his email accounts. FIG. 7 is a flowchart depicting a routine for providing information pertaining to a user's email accounts, in accordance with one embodiment. At step 510, gateway 231 obtains from record 710 the address data for each email account listed therein and the access data for each such account. In the illustrative example, gateway 231 examines fields 761-763 and retrieves the addresses and access data for Mr. Smith's email accounts with three different ESPs. At step 520, gateway 231 accesses each of the specified email accounts using the address and access data. Gateway 231 may communicate, via Internet 221, with the corresponding email servers at their respective URLs pursuant to a standard protocol such as IMAP or POP3. In particular, IMAP allows a client to access and manipulate email messages on the server. For example, IMAP allows a client to obtain the header information, e.g., the email sender name and/or origination address, subject of the email, email receipt time, etc., apart from the body of the email message. IMAP also permits manipulation of remote "mailboxes," in a way that is functionally equivalent to local mailboxes. IMAP further allows for creating, deleting, and renaming mailboxes; checking for new messages; permanently removing messages; setting and clearing flags, and other functions including parsing and searching. In accordance with IMAP, each email message stored on an email server is given a unique email message identifier (message ID). When a client inquires about or retrieves an email message from a server, the client can retrieve the associated message ID as well.

After accessing Mr. Smith's email accounts, gateway 231 examines header information for the emails in each account. By way of example, gateway 231 may access Mr. Smith's email accounts at Address1, Address2 and Address3, and determine contents of inboxes of the accounts, illustrated in FIGS. 8A-8C, respectively. FIG. 8A illustrates the content of the inbox associated with Address1, which includes such header information as the name of the sender (if provided, otherwise the sender's email address), subject information, and a receipt time stamp for each of eight email messages received in Mr. Smith's email account at Address1. For example, referring to entry 791, an email was received from Mike Sullivan concerning the subject "New Profile Server" on Thursday, June 24, YYYY, at 4:55:10 p.m. FIG. 8B illustrates similar information for Mr. Smith's email inbox associated with Address2; FIG. 8C illustrates similar information for his email inbox associated with Address3.

Returning to FIG. 7, at step 530, gateway 231 examines the header information concerning the email messages in each email account and determines which email messages are new. To determine which email messages are new, gateway 231 examines the receipt time stamp associated with each email message and designates as "new" any email message that was received after the date and time specified in field 725 of record 710. For example, referring again to entry 791 in FIG. 8A, the email message from Mike Sullivan was received on June 24, YYYY at 4:55:10 p.m., which is after the June 14, YYYY, 09:18:42 time stamp in field 725 of record 710 in Mr. Smith's email folder; accordingly, the email message from Mike Sullivan is designated as a new email message. On the other hand, referring to entry 798, the email message from GreenGrocer concerning "Asparagus Sale" was received on Saturday, May 30, YYYY at 7:49:07 a.m., which is before the June 14, YYYY, 09:18:42 time stamp in Mr. Smith's email folder; accordingly, the GreenGrocer email is not new. It should be noted that in an alternative embodiment, a user may configure message filter parameters in his/her email folder to redefine the test for "new" email messages. This function is discussed in more detail below.

At step 535, gateway 231 updates the time stamp in field 725 of record 710 to indicate that the Mr. Smith has checked his email. In this example, gateway 231 updates field 725 with the current date and time. At step 540, gateway 231 presents to the operator on terminal 220 a GUI, such as that shown in FIG. 9, containing information concerning the new email messages in Mr. Smith's email accounts.

Figure 9:
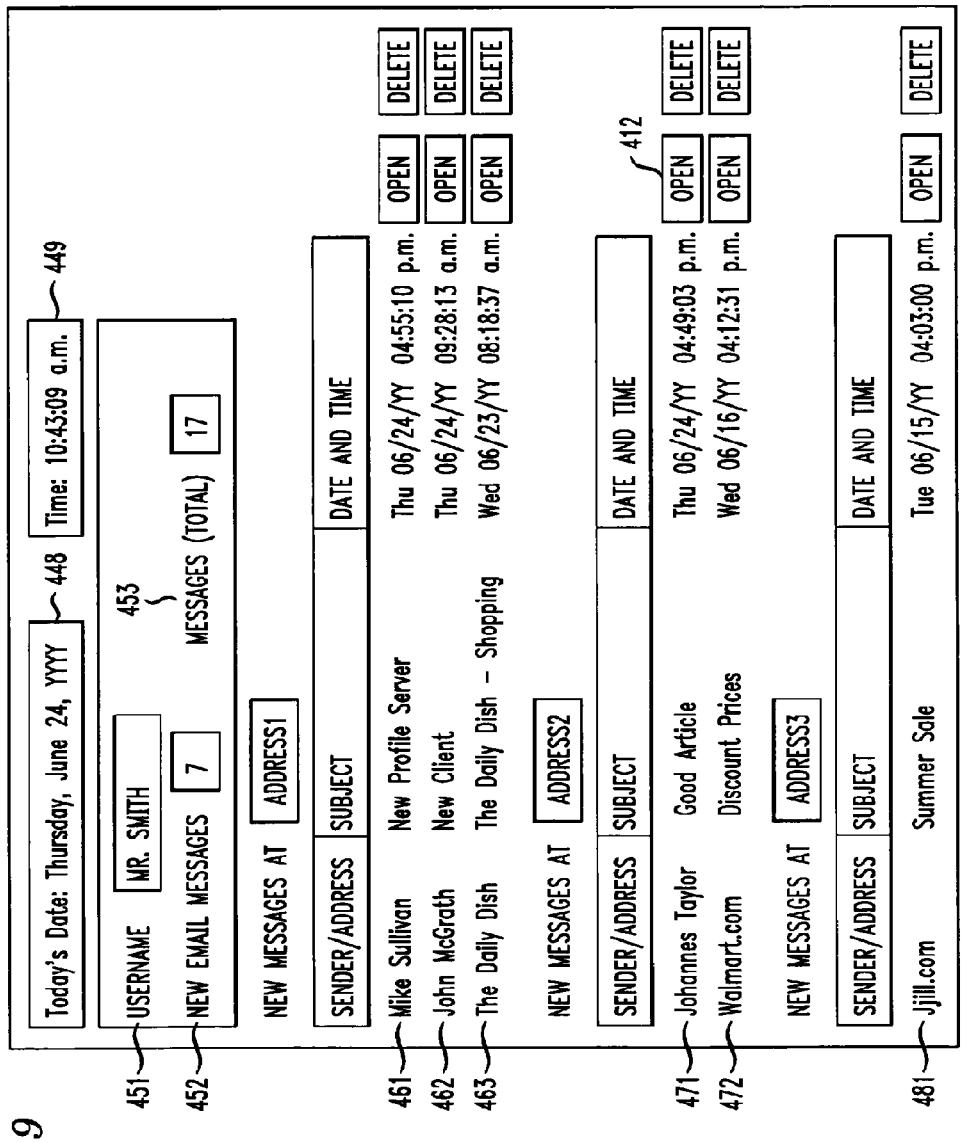
FIG. 9 illustrates a GUI containing information concerning email messages in a user's email accounts, in accordance with the invention.

GUI 430 in FIG. 9 displays summary data including, e.g., Mr. Smith's name at username entry 451, the number of new email messages in the user's email accounts (452) the total number of messages in the user's email accounts (453), and the current date (448) and time (449). Below the summary data, GUI 430 displays header information for each new email message present in the user's email accounts. For example, referring to entries 461-463, three new email messages are present in Mr. Smith's first email account at Address1. Similarly, two new email messages (entries 471-472) are present in Mr. Smith's second email account at Address2, and one new email message (entry 481) is present in Mr. Smith's account at Address3. In this example, GUI 430 displays, for each new email message, header information including the sender's name and/or email address, a subject line description, and the date and time the email message was received.

Figure 10:
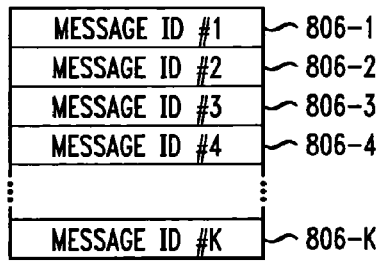
FIG. 10 illustrates a list of message IDs for selected email messages, in accordance with the invention.

In an alternative embodiment, gateway 231 determines whether or not an email message in an email account is new based on its message ID. In this embodiment, a list of message IDs is maintained in the user's email folder. The list holds message IDs of email messages that have been opened and read to the user. Accordingly, each time an information assistance provider opens and reads an email to the user, the message ID of the respective email is added to the message ID list in the user's email folder. FIG. 10 illustrates one such message ID list (denoted 803), which comprises K message ID entries 806-1 through 806-K, where K represents an integer. In one embodiment, message IDs are deleted from list 803 a predetermined period of time after being added.

Figure 11:
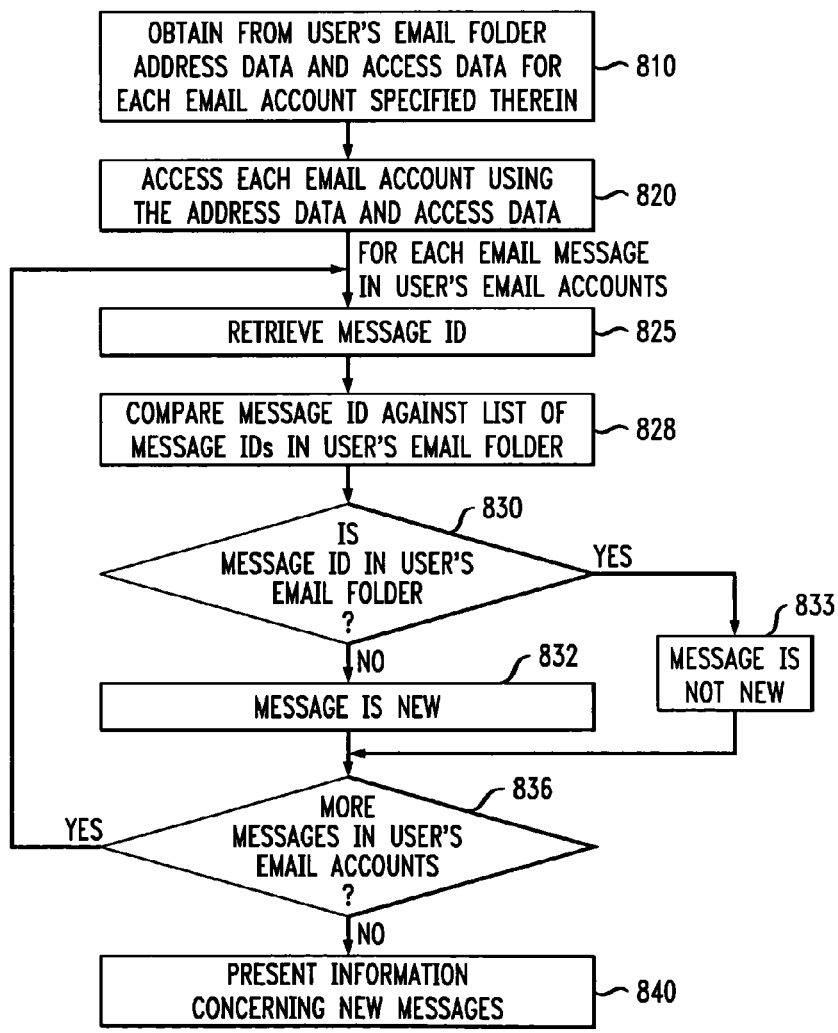
FIG. 11 is a flowchart depicting a routine for providing information concerning newly arrived email messages, in accordance with the invention.

FIG. 11 illustrates a routine for providing information pertaining to a user's email accounts, in accordance with the alternative embodiment. Steps 810 and 820 are identical to steps 510 and 520 in the routine of FIG. 7. Thus, gateway 231 obtains address data and access data from the user's email folder (step 810), and accesses each specified email account (step 820). For each email message in the user's email accounts, gateway 231 retrieves its message ID (step 825), and compares the message ID against the entries of list 803 (step 828). As indicated at block 830, if the message ID is not currently in list 803 (i.e., in the user's email folder), the email message is new (block 832). If the message ID is currently in list 803, the email message is not new (block 833). As indicated by block 836, after all the email messages in the user's accounts are examined, gateway 231 presents information concerning the new email messages on terminal 220 at step 840. It should be noted that other methods for identifying email messages (e.g., by sender's name and time of receipt) may be similarly used to determine whether or not a message is new.

Returning to FIG. 9, upon viewing GUI 430, an operator may inform Mr. Smith of the statuses of his email accounts. For example, the operator may state, "Mr. Smith, you have seven new messages in your email inboxes." The operator's status message may be varied. For example, the operator may alternatively state, "Three messages have arrived today. There are seventeen messages in your inboxes." The particular style of presentation of the email account statuses may be specified during the service registration, and recorded in the user's email folder for future reference.

The user's email account status information may alternatively be conveyed by voice server 230 to the user in automated voice. The user may also be provided with a menu of selectable options including "Read Headers," "Open," "Next," "Previous," "Delete," "Menu," "Forward," "Reply," "Repeat," and "Operator."

For example, when the "Read Headers" option is selected, e.g., by saying "Read Headers" or pressing a predetermined key on the telephone, gateway 231 initiates a "Read Headers" routine, causing voice server 230 to begin reading the header information for the new email messages. This may be done without prompting or an explicit selection of an option by the user. Thus, referring to FIG. 9, voice server 230 may automatically read the header information for the message from Mike Sullivan, then read the header information for the message from John McGrath, etc. For example, voice server 230 may announce:

"Received today from Mike Sullivan, subject New Profile Server,"
"Received today from John McGrath, subject New Client,"
"Received on June 23, YYYY from The Daily Dish, subject The Daily Dish-Shopping,"
"Received today from Johannes Taylor, subject Good Article," etc.

Voice server 230 may also read the addresses listed in the 'To:' field and/or the addresses listed in the 'cc:' field of each email message. Additionally, voice server 230 may inform the caller of the existence of any attached files in an email message. In an alternative embodiment, the operator may read the header information and other information in response to a request by the user.

It should be noted that at any time during a user's interaction with voice server 230, the user may state "Menu" (or, alternatively, press a predetermined key on his/her telephone) to cause a list of currently available options to be played. For example, if Mr. Smith says "Menu" at any time during the "Read Headers" routine, the "Read Headers" routine stops and voice server 230 reads a menu of options, such as "Read Headers," "Open," "Next," "Previous," "Delete," "Menu," "Forward," "Reply," "Repeat," and "Operator."

Figure 12:
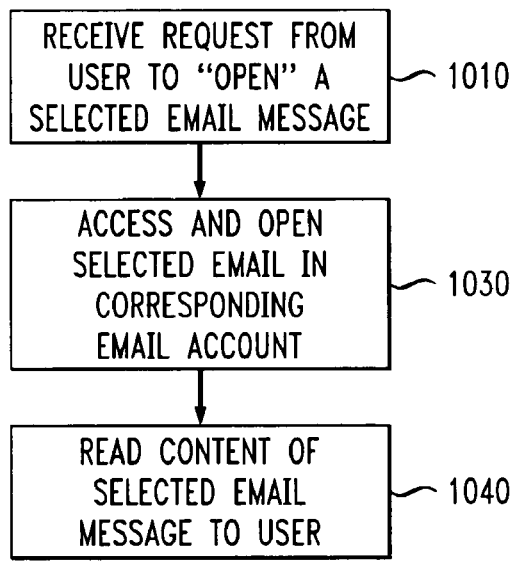
FIG. 12 is a flowchart depicting a routine for opening and reading an email message, in accordance with the invention.

Continuing with the above example, while the header information is being read, Mr. Smith may request that a particular email message be opened and read. For example, after voice server 230 reads the header information for the email message from Johannes Taylor, Mr. Smith may say "Open" (or press a predetermined key on his telephone). FIG. 12 illustrates a routine for opening and reading an email message in response to Mr. Smith's request, in accordance with an embodiment. At step 1010, voice server 230 receives a request to open a selected email message from Mr. Smith when he says "Open". In response, voice server 230 signals Gateway 231 to access and open the selected email message (step 1030). Alternatively, on hearing Mr. Smith's request, the operator attending to the call may select the email message in question, e.g., by selecting on the "Open" option 412 to the right of the Johannes Taylor message header information. After the email message is opened, voice server 230 at step 1040 reads the content of the email to Mr. Smith by means of a conventional text-to-voice conversion application. In the alternative embodiment described above, after an email message is opened and read, its message ID is added to list 803 in the user's email folder.

Figure 13:
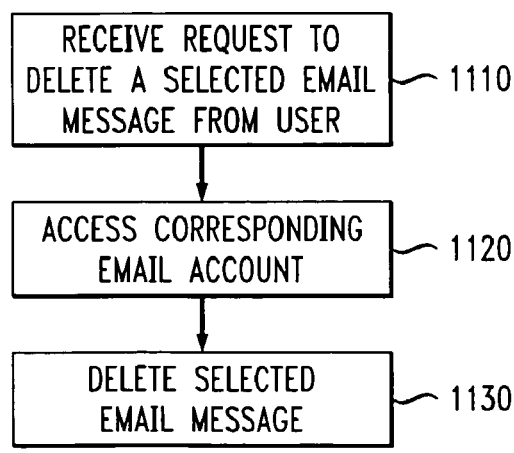
FIG. 13 is a flowchart depicting a routine for deleting an email message, in accordance with the invention.

While a email message is being read or after it has been read by voice server 230, a user is provided with multiple options. For example, the user may wish to delete the message. FIG. 13 is a flowchart depicting a routine for deleting an email message in response to a user's request. Suppose that after hearing the email message from Johannes Taylor, Mr. Smith wishes to delete it. Accordingly, he may say "Delete" either during or within a configurable amount of time after the selected email message is read. Mr. Smith's request to delete the selected email message is received by voice server 230 at step 1110. In response, server 230 signals gateway 231 to access the corresponding email account, as indicated at step 1120, which is in this instance Mr. Smith's email account at Address1. At step 1130 gateway 231 causes the selected email message to be deleted. Mr. Smith may be provided with an opportunity to confirm his choice before the message is deleted. For example, voice server 230 may state, "This message will be deleted from you email account. To cancel this action press '1' now." Thus, to confirm his decision to delete the message, Mr. Smith may press '1' on his telephone.

If while a message is being read, the user wishes to skip the remainder of the message and hear header information for the next message immediately, the user may say "Next." In response, voice server 230 stops reading the current email message, and gateway 231 activates the "Read Headers" routine, causing voice server 230 to read the header information concerning the next email message. Similarly, the user may say, "Previous" to listen to the header information concerning a previous email message. In response to the user's request, voice server 230 stops reading the current message, and gateway 231 activates the "Reader Headers" routine, starting with the email message immediately prior to the current message. If the user wishes to return immediately to the operator, he/she may say "Operator." In response, voice server 230 stops reading the email message, and the user is reconnected to the operator. If the user wishes to hear a message again after it has been read, he/she may say, "Repeat," and in response, voice server 230 reads the message again to the user.

Figure 14:
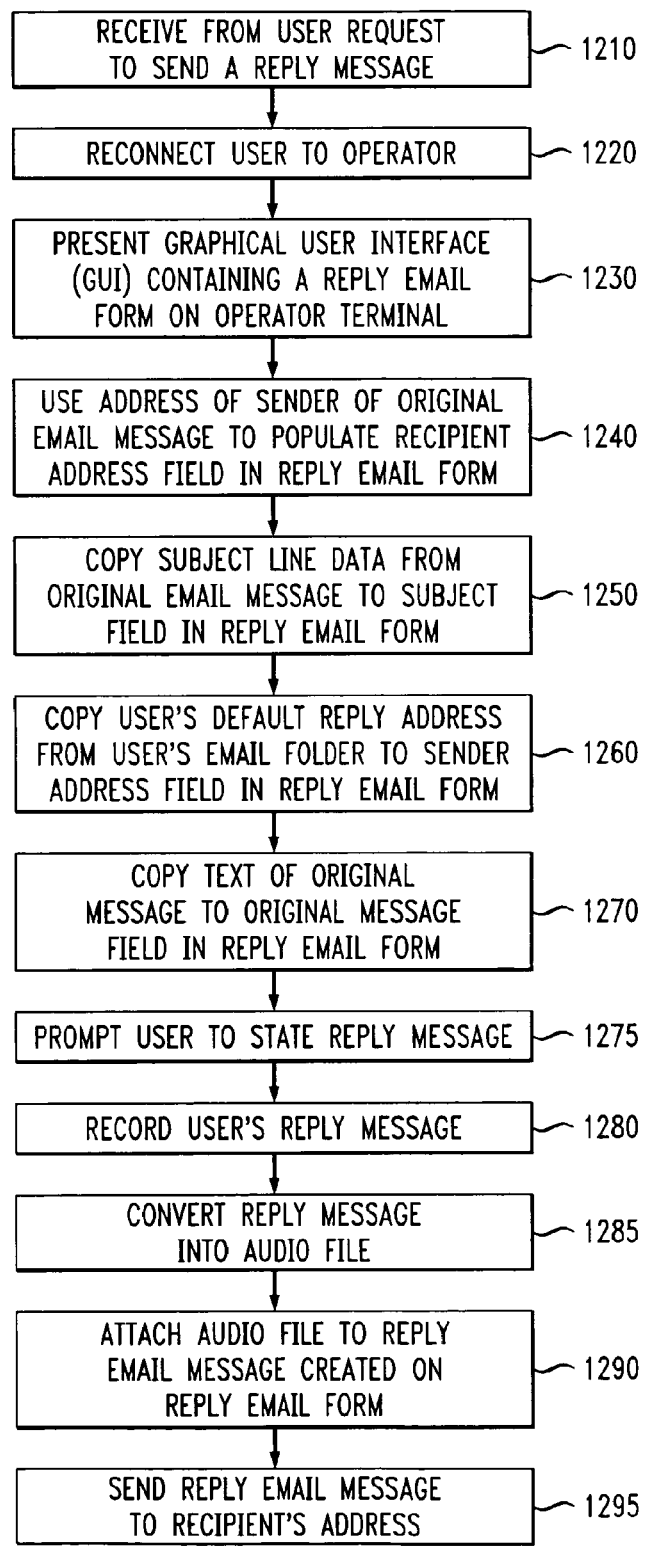
FIG. 14 depicts a routine for creating and sending a reply email message, in accordance with the invention.

Let's suppose that after hearing the Johannes Taylor message, instead of deleting the message, Mr. Smith wishes to send a reply email message. Accordingly, he may say, "Reply," or, alternatively, press a predetermined key on his telephone. FIG. 14 illustrates a routine for creating and sending a reply email message in response to a user's request, in accordance with an embodiment. At step 1210, the request for sending a reply message is received from Mr. Smith. At step 1220, Mr. Smith is reconnected to the operator, and at step 1230, gateway 231 presents a GUI containing a reply email form to the operator on terminal 220. FIG. 15A illustrates an example of a reply email form 1330 that may be presented on terminal 220. Form 1330 comprises fields 1332, which holds an address of the intended recipient of the reply message, field 1334, containing an address of the sender of the email (which in the case of a reply email message is the address of the user), and field 1336, containing a description of the subject of the message. Fields 1345-1346 contain the reply message and the original message, respectively.

Several fields in form 1330 are populated automatically based on the header information in the original email message. Thus, at step 1240, gateway 231 retrieves the address of the sender of the original email message (in this instance, the address of Johannes Taylor) and uses it to populate recipient address field 1332 in voice email form 1330. At step 1250, gateway 231 copies the subject line data from the original email message to subject field 1336 in form 1330. At step 1260, gateway 231 accesses Mr. Smith's email folder, retrieves Mr. Smith's default reply address from field 730 in record 710, and enters the default reply address into sender address field 1334 of form 1330. At step 1270, gateway 231 copies the text of the original message to original message field 1346 of form 1330.

At this point, Mr. Smith is connected to voice server 230 to create a voice audio file, which may be in an MP3 format. At step 1275, Mr. Smith is prompted to utter his reply message. For example, either the operator or voice server 230 may announce, "Please speak your reply message at the tone; it will be recorded as an audio file and sent as an attachment to your reply message." At step 1280, voice server 230 records Mr. Smith's spoken reply message and, at step 1285, converts it into an audio file. Voice server 230 provides the audio file to gateway 231. At step 1290, gateway 231 attaches the audio file to the reply message, e.g., in field 1345 of form 1330, and at step 1295, sends the reply message to the recipient's address. In an alternative embodiment, the spoken reply message recorded at step 1280 may be converted into a text message by means of a conventional voice-to-text conversion application. In this case, the converted text message may be inserted into field 1345 on form 1330; the reply message is then sent to the recipient as a text message.

Suppose instead that after hearing the Johannes Taylor message read, Mr. Smith wishes to forward the email message to a third party. Accordingly, Mr. Smith may say, "Forward," or, alternatively, press a predetermined key on his telephone. As a result, Mr. Smith is reconnected to the operator, and gateway 231 presents a GUI containing a forward email form on terminal 220. FIG. 15B illustrates an example of a forward email form 1370 that may be presented. Form 1370 comprises field 1372 for entry of an address of the intended recipient of the forward email message, field 1374 for entry of an address of the sender of the message (which in the case of a forward email message is the address of the user), and field 1376 for entry of a description of the subject of the message. Field 1385 is used for entry of any additional message that the user wishes to add to the original message. Field 1386 contains the original message.

The operator may then ask Mr. Smith to specify a recipient's address, and once an address is obtained, enter it into field 1372 on form 1370. Several fields in form 1370 are populated automatically based on the header information data in the original email message. Thus, for example, gateway 231 copies the subject line data from the original email message to subject field 1376 in form 1370. Gateway 231 also copies the text of the original message to original message field 1386 of form 1370. Gateway 231 may also access Mr. Smith's email folder, retrieve Mr. Smith's default reply address from field 730 of record 710, and insert the default reply address into sender address field 1374 of form 1370. Alternatively, the operator may prompt Mr. Smith to specify a sender address, obtain an address from Mr. Smith verbally, and enter the address into field 1374.

The operator may then ask Mr. Smith if he wishes to add his own message to the forward email message. If he answers in the affirmative, Mr. Smith may be connected to voice server 230 to create a voice audio file. Voice server 230 records Mr. Smith's spoken message and converts it into an audio file. Voice server 230 provides the audio file to gateway 231. Gateway 231 attaches the audio file to the forward email message, e.g., in field 1385 of form 1370, and sends the forward message to the recipient's address. In an alternative embodiment, the spoken message may be converted into a text message, e.g., by a voice-to-text conversion application. In that case, the converted text message may be inserted into field 1385 on form 1370; the forward email message is then sent to the recipient as a text message.

Figure 16A:
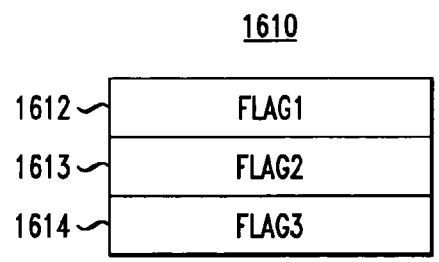
FIGS. 16A-16D respectively illustrate a set of tables in the user's email folder to facilitate message filtering functions, in accordance with the invention.
Figure 16B:
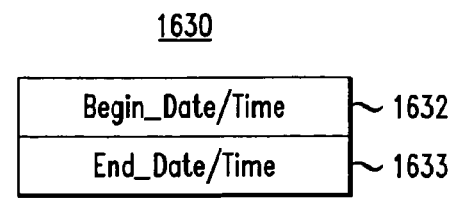
Figure 16C:
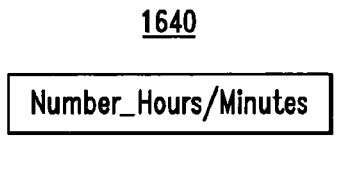
Figure 16D:
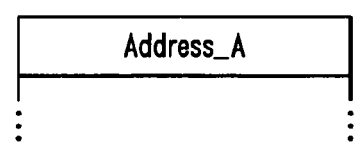

In another embodiment, a user may specify one or more parameters that may be used to control which email messages are presented to him or her. For example, a user may be afforded the option of selecting among several different types of "message filters." To enable this functionality, a set of tables such as those shown in FIGS. 16A-D may be stored in the user's email folder. Filter option table 1610 in FIG. 16A comprises three fields 1612-1614 and indicates which message filter(s), if any, the user has selected. Each of fields 1612-1614 contains a binary flag value. If each of fields 1612-1614 contains a flag value "0," the user has not selected a filter, and new email messages are presented to the user in the manner described above. However, if field 1612 contains a flag value "1," a "time range filter" is applied to the email messages in the user's email accounts, i.e., only those email messages that were received between a first specified date/time and a second specified date/time are presented to the user. If field 1613 contains a flag value "1," a "sliding time window filter" is applied, i.e., only those email messages that were received within a specified time period before the date and time at which the user call is received, are presented to the user. If field 1614 contains a flag value "1," an "address filter" is applied to the user's email messages, i.e., only email messages that were received from any one of predetermined email addresses are presented to the user. A user may be prompted either upon registration or at a later time to specify a message filter.

Figure 17A:
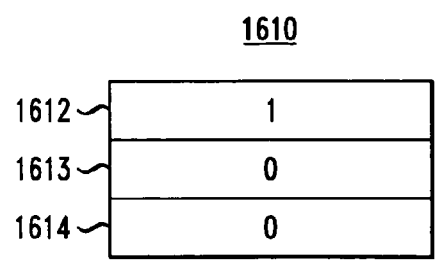
FIGS. 17A-17B respectively illustrate a filter option table and a time parameters table resulting from setting up a time range message filter.
Figure 17B:
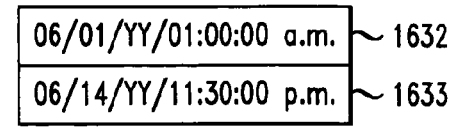

Suppose that Mr. Smith tells the operator that he wants to hear only messages that were sent between June 1, YYYY 01:00:00 a.m. and June 14, YYYY 11:30:00 p.m. Accordingly, the operator sets up a time range filter by entering these dates and times into appropriate fields on terminal 220, and, in response, gateway 231 inserts these sets of dates and times into time parameters table 1630 in FIG. 16B. In this instance, the parameter Begin_Date/Time in field 1632 assumes a value representing June 1, YYYY/01:00:00 a.m., and the parameter End_Date/Time in field 1633 assumes a value representing June 14, YYYY/11:30:00 p.m. Gateway 231 also assigns a flag value "1" to field 1612 in filter option table 1610, indicating that the time range filter is active. FIGS. 17A and B respectively illustrate tables 1610 and 1630 resulting from Mr. Smith's specifying the parameters Begin_Date/Time and End_Date/Time as described above.

Figure 18:
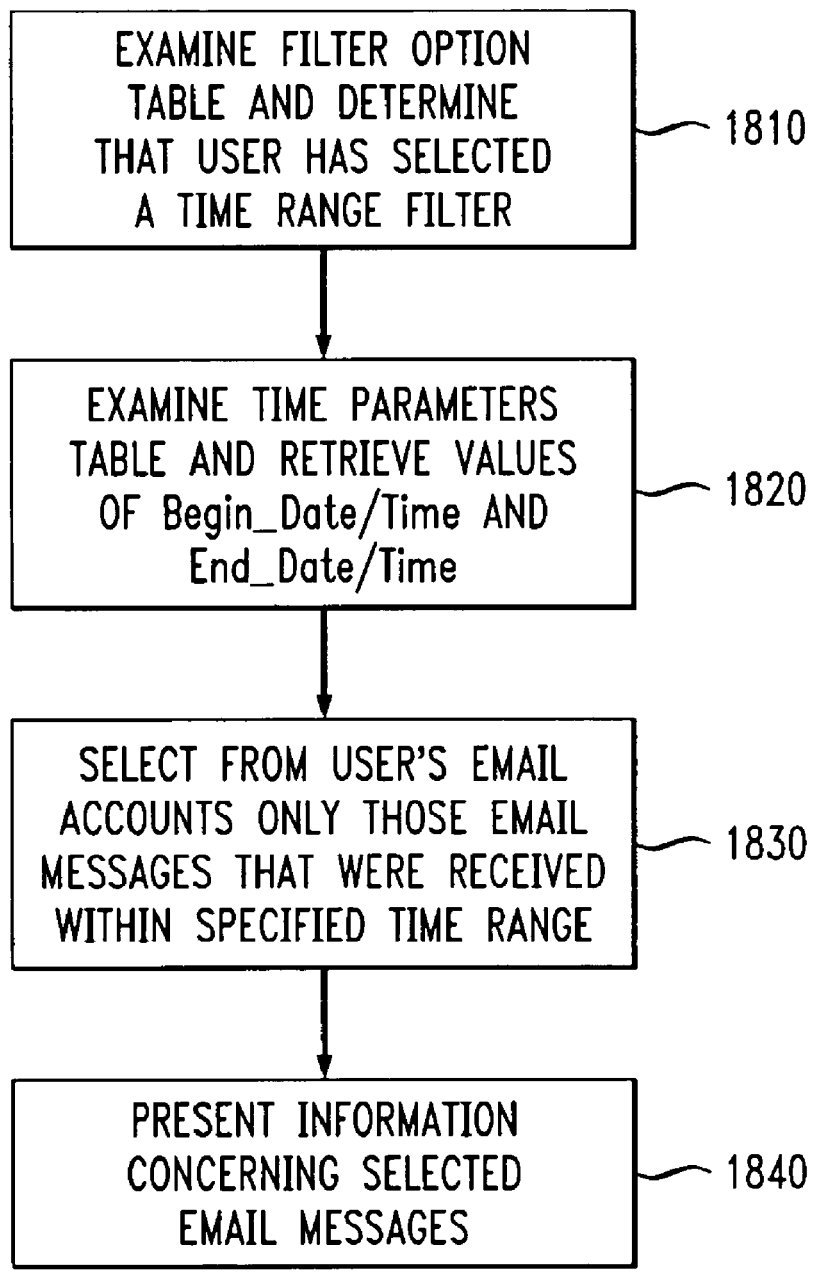
FIG. 18 is a flowchart depicting a routine for screening email messages using the time range message filter.

FIG. 18 illustrates a routine for providing information concerning email messages in a user's email accounts subject to a time range filter. At step 1810, gateway 231 examines filter option table 1610 in FIG. 17A and determines that, because field 1612 contains a flag value "1," Mr. Smith has selected a time range filter. Accordingly, at step 1820, gateway 231 examines time parameters table 1630 and retrieves the values of Begin_Date/Time and End_Date/Time, which in this instance are June 1, YYYY/01:00:00 a.m. and June 14, YYYY/11:30:00 p.m., respectively. After obtaining these values, gateway 231 at step 1830 selects from Mr. Smith's email accounts only those email messages that were received within the specified time range. Referring back to FIG. 8A, for example, gateway 231 selects from Mr. Smith's inbox associated with Address1 the email message from Keld at line 794, which was sent on Saturday, June 12, YYYY, and thus satisfies the specified time range. In this example, gateway 231 also selects the email messages from Sarah Chang per entry 795, the message from Mike Sullivan per entry 796 and the message from Keld per entry 797. Gateway 231 also examines Mr. Smith's email accounts at Address2 (FIG. 8B) and Address3 (FIG. 8C), and selects all email messages that satisfy the specified time range. At step 1840, gateway 231 presents information concerning the selected email messages to the operator in a GUI on terminal 220. FIG. 19 illustrates one such GUI denoted 1730. GUI 1730 displays only those email messages in Mr. Smith's email accounts that were received between (in this case inclusive of) June 1, YYYY/01:00:00 a.m. and June 14, YYYY/11:30:00 p.m. For example, the email from Keld in entry 794 in FIG. 8A is listed as entry 1742 in GUI 1730. At this point, the operator may read the header information in GUI 1730 to Mr. Smith; alternatively, gateway 231 may initiate a "Read Headers" routine and cause voice server 230 to read the header information automatically.

Suppose that Mr. Smith instead asks the operator to set up a sliding time window filter so that whenever he calls to receive an update concerning his email accounts, only those email messages that were received during the past two days are reported. In this case, referring to FIG. 16C, the length of the time window specified by Mr. Smith is stored in table 1640, which comprises a Number_Hours/Minutes field. Accordingly, the operator may enter "48:00" in a predetermined field on terminal 220, and gateway 231 in response may insert the value "48:00" into table 1640. Consequently, the Number_Hours/Minutes assumes the value "48:00."

Gateway 231 also assigns a flag value "1" to field 1613 of filter option table 1610, indicating that the sliding time window filter is active.

Subsequently, if Mr. Smith asks the operator for the status of his email accounts, gateway 231 examines filter option table 1610 and determines that, because field 1613 contains a flag value "1," Mr. Smith has selected a sliding time window filter. Accordingly, gateway 231 examines table 1640 and finds that the Number_Hours/Minutes field therein contains the value "48:00." Accordingly, gateway 231 may generate on terminal 220 a GUI presenting information concerning only those email messages that were received in the last two days. Alternatively, gateway 231 may initiate a "Read Headers" routine and cause voice server 230 to read the header information concerning such email messages to the user.

Suppose that Mr. Smith asks the operator to set up an address filter so that only email messages received from one or more selected email addresses are presented to him when he checks email messages in his accounts. For example, Mr. Smith may ask that he only be presented email messages that are received from Johannes Taylor. Mr. Smith provides the email address of Johannes Taylor, say, "JT_address," and the operator enters "JT_address" into an appropriate field on terminal 220. In response, gateway 231 enters "JT_address" into table 1675, which in this example comprises only one field. It should be noted that a user may provide multiple addresses, and thus table 1675 may comprise multiple fields each holding a different address. Gateway 231 also assigns a flag value "1" to field 1614 of filter option table 1610.

Figure 20:
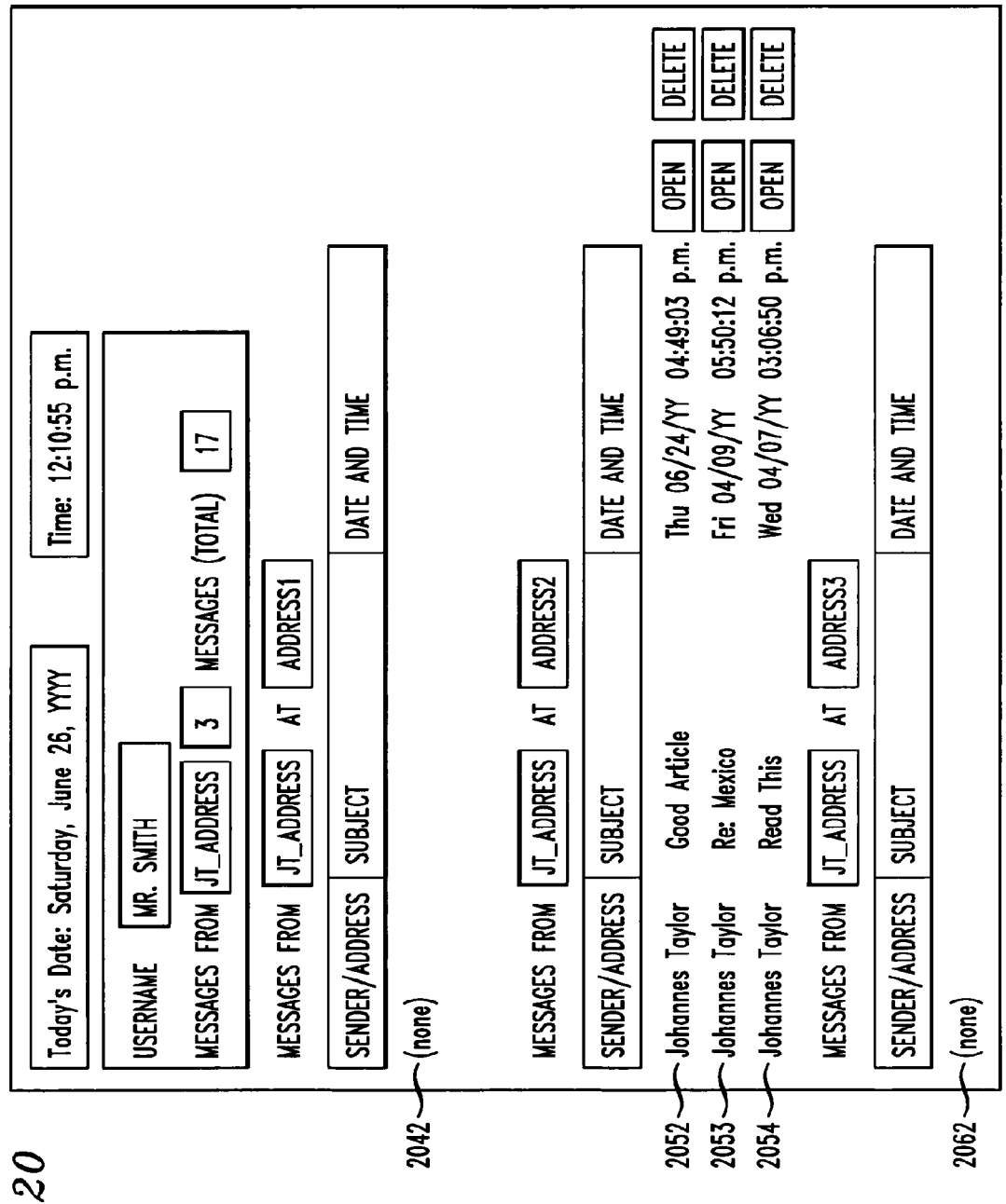
FIG. 20 illustrates a GUI containing information concerning email messages received from a selected sender's address, in accordance with a message address filter.

Subsequently, if Mr. Smith asks the operator for the status of his email accounts, gateway 231 examines filter option table 1610 and determines that, because field 1614 contains a flag value "1," Mr. Smith has selected an address filter. Accordingly, gateway 231 examines table 1675 and retrieves the address "JT_address." Gateway 231 then retrieves from Mr. Smith's three email accounts any emails that were received from "JT_address." Since "JT_address" is the email address of Johannes Taylor, gateway 231 may generate on the operator terminal 220 a GUI displaying only email messages received from Johannes Taylor. For example, gateway 231 may generate GUI 2030 as shown in FIG. 20, which lists the email messages from Johannes Taylor that were received in Mr. Smith's three email accounts. Referring to GUI 2030, entry 2042 indicates that no email messages from Johannes Taylor are present in the email account at Address1. Three email messages from Johannes Taylor are shown at entries 2052-2054 in the email account at Address2; and no email messages from Johannes Taylor are present in the account at Address3 (line 2062).

It should be noted that message filters are not necessarily mutually exclusive. For example, Mr. Smith may choose to select both a time range filter and an address filter, in which case gateway 231 may cause only email messages sent from a selected group of addresses between a first specified date/time and a second specified date/time to be presented to Mr. Smith. Other possibilities may also be possible. It should also be noted that although only three message filter options are described in the illustrative example, any number of filter options may be made available to users of the information assistance service.

It should also be noted that an operator may, at the request of a user, override any pre-existing message filters and cause gateway 231 to select and present email messages satisfying parameters specified during the user's call. For example, suppose that Mr. Smith has previously established a sliding time window filter to show only those email messages that were sent during the past 48 hours. Nevertheless, Mr. Smith may call the information assistance service and ask to hear header information for all email messages sent in the past six months. In response, the operator may override Mr. Smith's existing parameter settings and cause gateway 231 to select all email messages from Mr. Smith's accounts that were sent during the past six months. Gateway 231 accordingly presents a GUI to the operator displaying the requested email messages, and the operator may report the results to Mr. Smith.

In yet another embodiment, a user may specify an email address, referred to as an "alert address," in his/her email folder, to which notices are sent when new email messages arrive in his/her email accounts. Gateway 231 may accordingly access the user's email accounts automatically and periodically to verify the status thereof. Whenever gateway 231 detects that a new email has arrived in one of the user's email accounts, gateway 231 causes an "alert" message, in the form of, e.g., a text message, to the alert address specified in the user's email folder.

The foregoing merely illustrates the principles of the invention. It will thus be appreciated that those skilled in the art will be able to devise numerous other arrangements that embody the principles of the invention and are thus within the spirit and scope of the invention, which is defined by the claims below.

Finally, information/call center 200 and its components are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for providing information assistance at an information assistance system, said method comprising the steps of:
    storing data at said information assistance system concerning accessing an email service for retrieving a user's emails from one or more email accounts associated with a user;
    receiving a communication from a user's device at said information assistance system for accessing said email service from the user through a first communications connection;
    retrieving a first time stamp stored at said information assistance system representing a date and time corresponding to the previous time said user accessed said email service of said information assistance system;
    retrieving the data corresponding to said first time stamp;
    accessing the one or more email accounts over a second communications connection;
    performing one or more operations with respect to one or more email messages received in the one or more email accounts on behalf of the user;
    providing, to the user's device, information concerning at least one email message in the one or more email accounts;
    obtaining a second time stamp associated with a selected email message received in one of the email accounts;
    comparing said second time stamp with said retrieved first time stamp, associated with a previous access of said email service by the user's device; and
    providing information concerning the selected email message to the user's device if said second time stamp is subsequent to said first time stamp.

2. The method of claim 1, wherein said user's d mobile device and the communication includes a telephone call.

3. The method of claim 2, wherein the first communications connection includes a telephonic connection.

4. The method of claim 1, wherein said user's device is a mobile device and the second communications connection includes an Internet connection.

5. The method of claim 1, wherein the information includes header information concerning the at least one email message.

6. The method of claim 1, wherein the one or more operations include:
    obtaining an identifier of a selected email message received in one of the email accounts;
    comparing the identifier against a list of identifiers of email messages; and determining whether to provide information concerning the selected email message to the user based on a result of the comparison.

7. The method of claim 6, wherein the at least one email message includes the selected email message when the identifier is not included in the list.

8. The method of claim 1, wherein the one or more operations include: obtaining sender data pertaining to a selected email message received in one of the email accounts; and determining whether to provide information concerning the selected email message to the user's device based on the sender data.

9. The method of claim 8, wherein the sender data includes an email address from which the selected email message originates.

10. The method of claim 1, wherein the information is provided by reading content of the at least one email message to the user's device.

11. The method of claim 10, further comprising: in response to a request by the user's device, generating a reply email message based on the at least one email message; and sending the reply email message to a recipient.

12. The method of claim 11, further comprising: receiving a voice message from the user's device; converting the voice message to an audio file; and attaching the audio file to the reply email message.

13. The method of claim 10, further comprising forwarding the at least one email message to a recipient in response to a request by the user's device.

14. The method of claim 1, wherein the data includes addresses of the one or more email accounts.

* * * * *

UNITED STATES PATENT AND TRADEMARK OFFICE
CERTIFICATE OF CORRECTION

PATENT NO. : 8,457,299 B2
APPLICATION NO. : 12/961827
DATED : June 4, 2013
INVENTOR(S) : Miller et al.

It is certified that error appears in the above-identified patent and that said Letters Patent is hereby corrected as shown below:

In the Claims:

Column 16, Claim 2, Line 9: The word "d" between the words "user's" and "mobile" should be "device"

Column 16, Claim 2, Line 9: The word --and-- should be inserted between the words "mobile" and "device"

Signed and Sealed this
Twentieth Day of August, 2013

Teresa Stanek Rea
*Acting Director of the United States Patent and Trademark Office*